(12) United States Patent
Lee et al.

(10) Patent No.: US 7,567,552 B2
(45) Date of Patent: *Jul. 28, 2009

(54) REGISTERING AN IP PHONE WITH AN IP PHONE SWITCH

(75) Inventors: Gordon Lee, Kanata (CA); Jean-Yves Patry, Aylmer Jahzez (CA); Marc Beauregard, Hull (CA)

(73) Assignee: Mitel Networks Corporation, Ottawa Ontario (CA)

( * ) Notice: Subject to any disclaimer, the term of this patent is extended or adjusted under 35 U.S.C. 154(b) by 671 days.

This patent is subject to a terminal disclaimer.

(21) Appl. No.: 11/110,069

(22) Filed: Apr. 20, 2005

(65) Prior Publication Data
US 2005/0185639 A1    Aug. 25, 2005

Related U.S. Application Data

(63) Continuation of application No. 09/810,520, filed on Mar. 16, 2001, now Pat. No. 6,958,992.

(51) Int. Cl.
*H04L 12/66* (2006.01)
(52) U.S. Cl. ..................................... 370/352
(58) Field of Classification Search ................. 370/352, 370/329, 331, 349, 353, 338, 280, 217, 355, 370/254, 347, 395, 466, 264, 351, 230, 356; 455/445, 456, 404, 417, 432, 433, 296, 422, 455/556; 375/346, 348; 709/229, 220, 238, 709/242, 250, 236, 213, 217, 201, 202
See application file for complete search history.

(56) References Cited

U.S. PATENT DOCUMENTS

| | | | | |
|---|---|---|---|---|
| 5,563,931 A * | 10/1996 | Bishop et al. | ............ | 455/404.1 |
| 5,797,097 A * | 8/1998 | Roach et al. | ............ | 455/456.2 |
| 5,859,897 A * | 1/1999 | Furman et al. | ........... | 379/88.01 |
| 5,903,559 A * | 5/1999 | Acharya et al. | ............ | 370/355 |
| 6,088,337 A * | 7/2000 | Eastmond et al. | ........... | 370/280 |
| 6,519,242 B1 * | 2/2003 | Emery et al. | ................ | 370/338 |
| 6,560,216 B1 * | 5/2003 | McNiff et al. | ............... | 370/349 |
| 6,636,742 B1 * | 10/2003 | Torkki et al. | ............ | 455/456.1 |
| 6,717,938 B1 * | 4/2004 | D'Angelo | ................... | 370/352 |
| 6,738,362 B1 * | 5/2004 | Xu et al. | ..................... | 370/329 |
| 6,751,459 B1 * | 6/2004 | Lee et al. | .................... | 455/445 |
| 6,775,255 B1 * | 8/2004 | Roy | .......................... | 370/331 |
| 6,775,273 B1 * | 8/2004 | Kung et al. | ................. | 370/356 |

FOREIGN PATENT DOCUMENTS

CA    2289455    7/1999

* cited by examiner

*Primary Examiner*—Wing F Chan
*Assistant Examiner*—Prenell P Jones

(57) ABSTRACT

A method and apparatus for registering IP phones with an IP phone switch using access codes or personal identification numbers for authentication and for associating directory numbers to MAC addresses of IP phones.

4 Claims, 9 Drawing Sheets

REGISTERING AN IP PHONE WITH AN IP PHONE SWITCH

CONTINUATION DATA

This is a continuation of U.S. application Ser. No. 09/810,520 filed on Mar. 16, 2001, now U.S. Pat. No. 6,958,992 the disclosure therein is incorporated by reference herein.

FIELD OF INVENTION

This invention relates to Internet Protocol (IP) telephony and in particular to a method and apparatus for registering an IP phone with an IP phone switch.

BACKGROUND OF THE INVENTION

An IP phone switch is a phone system switch which has ports for connections to data networks to enable telephone connectivity and voice transport, and may further include connections to a public switched telephone network (PSN). A data network herein includes at least one of a local area network (LAN), a wide area network (WAN), and the global Internet. IP phone switches feature Voice over the Internet (VoIP) or IP telephony. VoIP is anticipated to replace the PSTN as the dominant voice transport system in due course.

The development of IP telephony has resulted in IP-based network telephone systems for enterprises. Such systems have IP phones. Each IP phone is programmed with a unique Media Access Control (MAC) address that allows it to be recognized by the IP phone switch at any point in the network. Each IP phone and its associated communications server communicate over a local area network (LAN) using an IP address (layer 3) and MAC address (layer 2). The IP phone switches are programmed with a list of valid MAC addresses and their associated telephone numbers, extension numbers or directory numbers. Typically such MAC addresses are manually entered into an IP phone switch.

The disadvantages of manual entry of MAC addresses include attendant keyboarding errors, and difficulty in re-associating the directory numbers with other MAC addresses when people move within an enterprise.

SUMMARY OF THE INVENTION

According to an aspect of the present invention, there is provided a method and apparatus for registering IP phones with an IP phone switch using access codes or personal identification numbers for authentication and for associating directory numbers to MAC addresses of IP phones.

The advantages of associating a directory number to a new IP phone by inputting an access code include permitting different access codes for different purposes such as an access code for initializing an IP phone for a limited time period; permitting a directory or telephone number to travel with a person so that wherever the person may be he or she may receive telephone calls on the same telephone number; and relieving the administrator of the IP phone switch from having to manually input the MAC address or the IP address of the IP phone.

BRIEF DESCRIPTION OF THE DRAWINGS

The present invention will be described in detail with reference to the accompanying drawings, in which like numerals denote like parts, and in which.

DETAILED DESCRIPTION OF THE PREFERRED EMBODIMENTS

Figure 1:
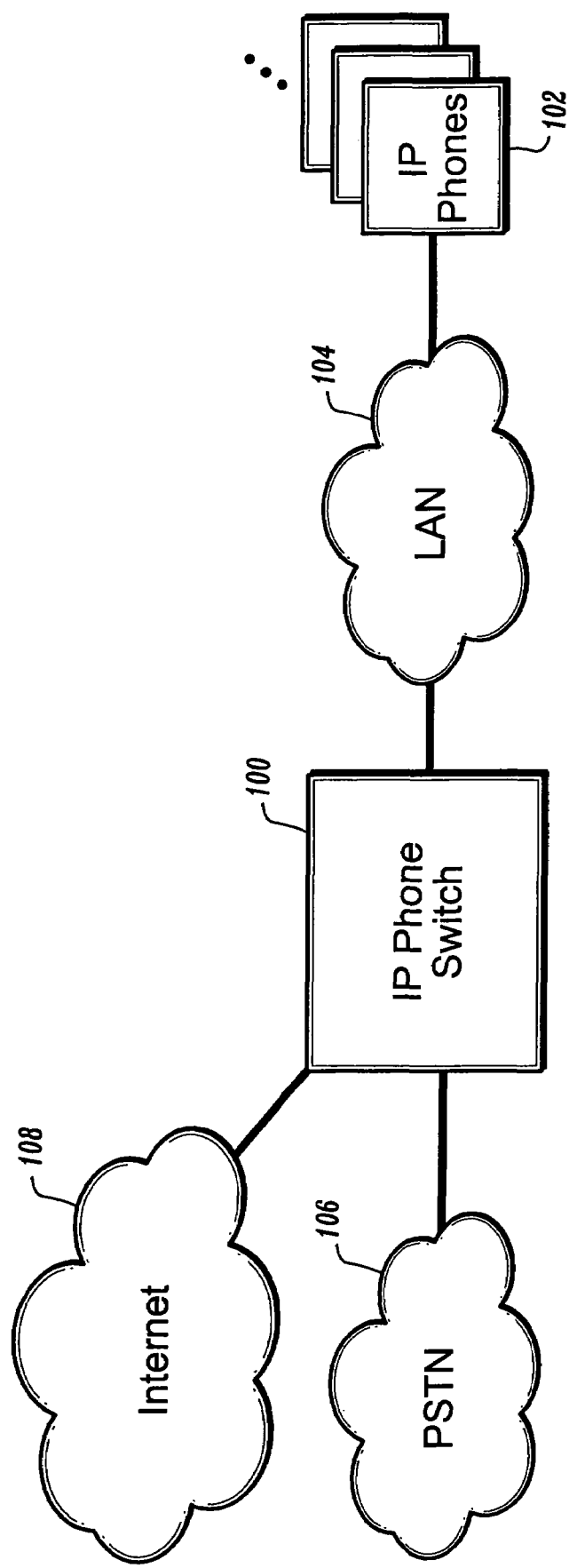
FIG. 1 illustrates an overview of a phone system including an IP phone switch and a plurality of IP phones.

Turning to FIG. 1, a phone system is shown which comprises of an IP phone switch 100 managing a plurality of IP phones 102 over a LAN 104. The phone system is also connectable to a PSTN 106 and to the Internet 108. The IP phone switch 100 routes and switches call traffic of the IP phones 102 over the PSTN 106 and the Internet 108, and between the IP phones 102.

Each IP phone 102 is an intelligent phone device that is uniquely identified by an associated Media Access Control address. When the IP phone 102 is powered, it establishes an IP socket with the IP phone switch 100 and uses Dynamic Host Configuration Protocol (DHCP) to obtain an IP address from the IP phone switch 100. The IP phone 102 further supports the ability to prompt a user on its display to enter a personal identification number (PIN) and to forward the PIN to the IP phone switch 100. Further, the IP phone 102 has a feature, which locks up (i.e. renders inoperable) the IP phone upon receiving a lock set command.

Figure 2:
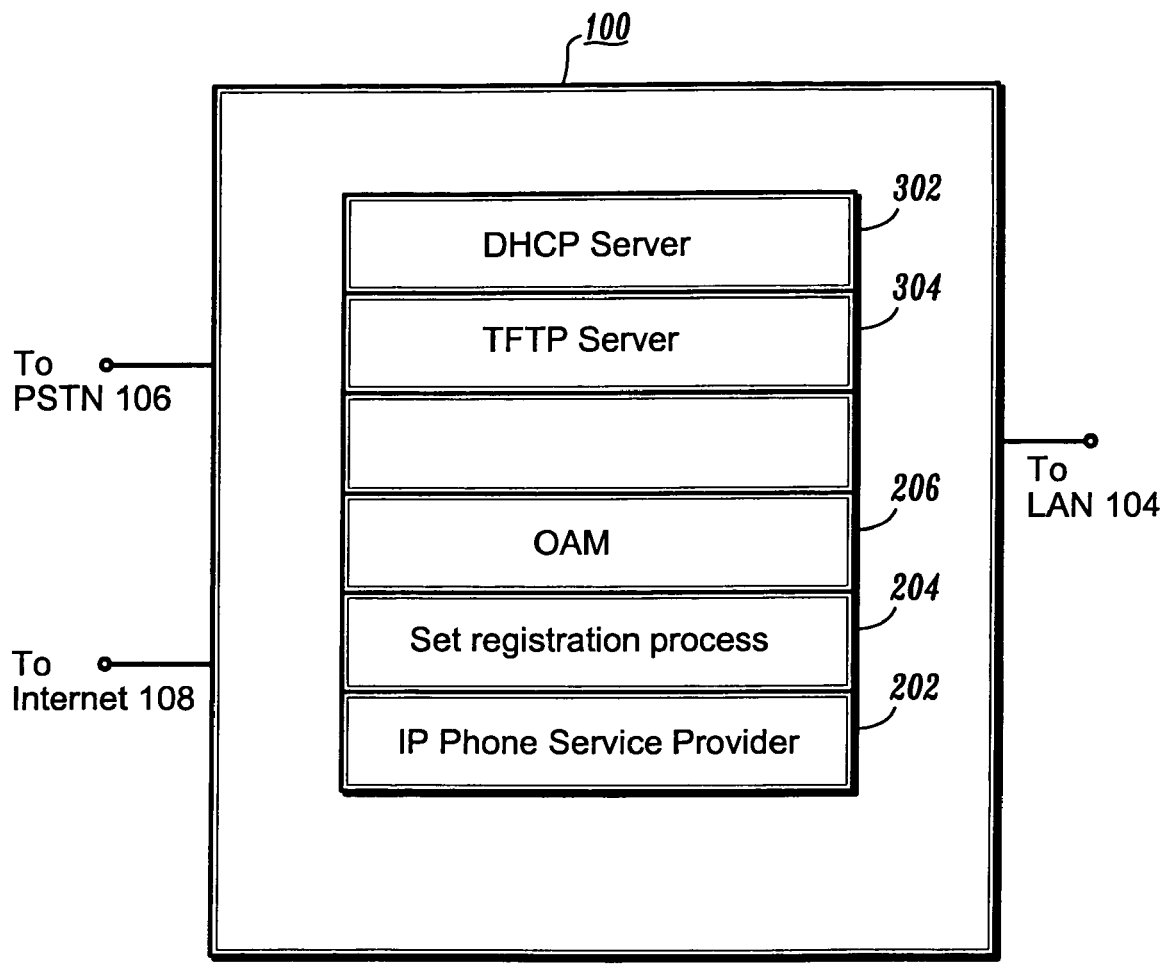
FIG. 2 illustrates some of the functional blocks of the IP phone switch shown in FIG. 1.

Referring to FIG. 2, the IP phone switch 100 of FIG. 1 is better illustrated. As can be seen, IP phone switch 100 includes three primary functional blocks namely: an IP phone service provider 202, a set registration process 204, and an OAM (Operations, Administration and Maintenance) 206. The IP phone switch also includes a DHCP server 302 and a TFTP (Trivial File Transfer Protocol) server 304 for establishing IP sockets The IP phone service provider 202, establishes an IP socket between the IP phone 102 and the rest of the IP phone switch 100 to permit communications between the two entities.

The set registration process 204, obtains current database information from OAM 206 to determine which IP phones 102 have already been registered. This data is in the form of a Physical Location Identifier (PLID), which is a 4 byte field that provides a unique database reference for each IP phone, the directory number (DN) assigned to the IP phone 102 and the MAC address of the IP phone 102 (this field may be blank if an IP phone has not been registered). Upon IP phone 102 boot up, the set registration process 204 receives the MAC address from the IP phone 102 via the IP Phone Service Provider 202 to determine if the IP phone 102 needs to be registered. The set registration process 204 requests the IP phone 102 to display an IP phone registration prompt and receive data input from a user if the IP phone 102 has not been registered.

The OAM 206 comprises a database that stores: the DN for each IP phone 102 against its PLID; an access code for registering an IP phone 102; a separate access code to override the current DN to IP phone relationship; a programmable threshold n, which disables the override access code when greater than n consecutive attempts to override fail due to an invalid access code; and the PLID to DN to IP phone relationship, which is based on the unique MAC address associated with each IP phone 102 (PLID/lookup table).

Figure 3:
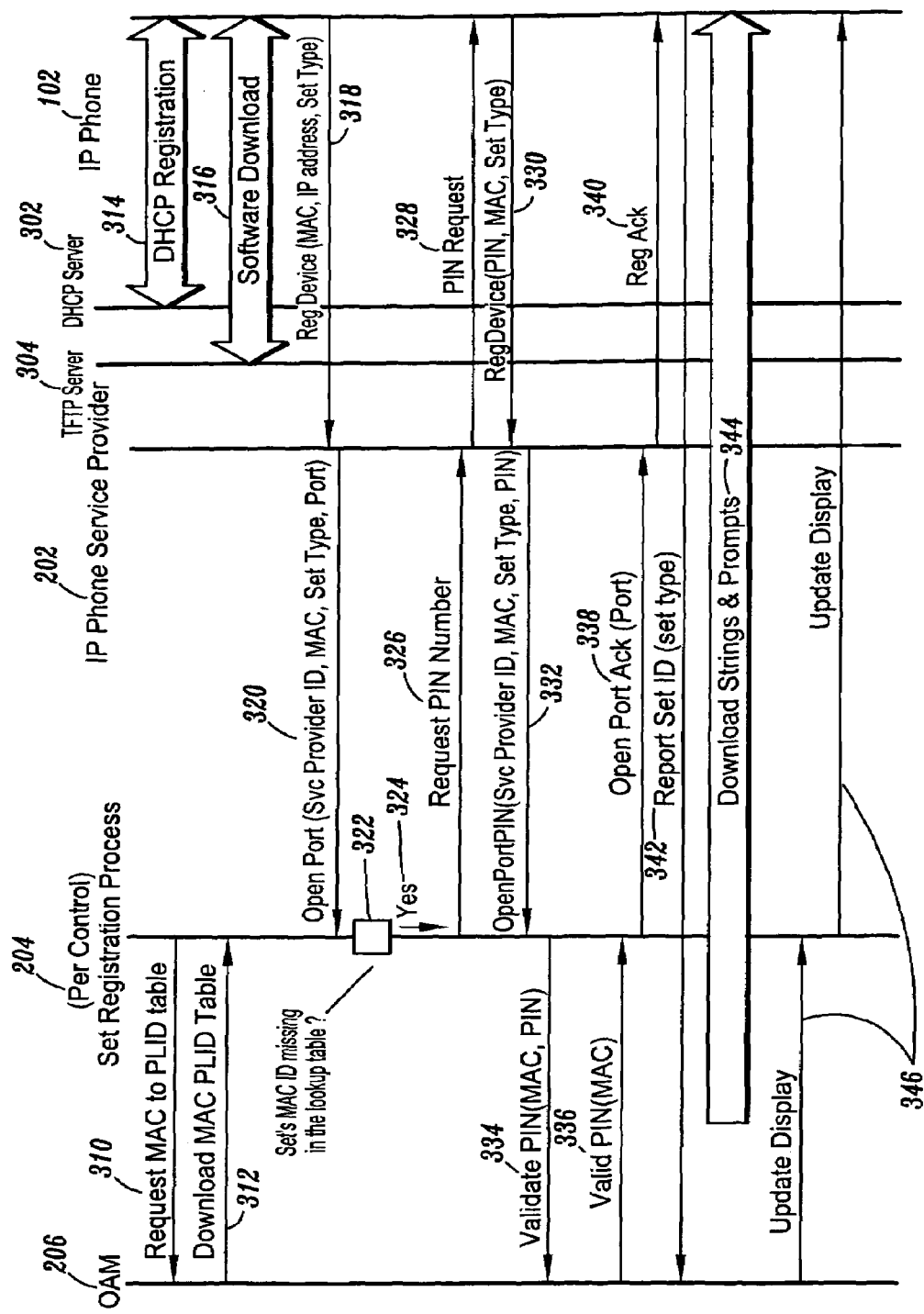
FIG. 3 is a data flow diagram showing registration of an IP phone according to the phone system of FIG. 1.

FIG. 3 shows a data flow for registration of an unregistered IP phone 102 on the IP phone switch 100 where a PIN has been assigned to a user, but a MAC address has not been associated with the PIN. The composition of the PIN includes an access code and a DN.

To initialize the IP phone switch 100, the set registration process 204 requests 310 and receives 312 the information from the OAM 206 database for the lookup table. In order to boot-up the IP phone 102 for the IP phone switch 100, the IP phone 102 has to establish an IP socket with the IP phone switch 100, and send a request 320 for registration to the IP phone switch 100. Specifically, the IP phone 102 communicates with the DHCP server 302 to obtain an IP address for itself as shown at 314. The DHCP server 302 further directs the IP phone 102 to get the necessary socket software from a Trivial File Transfer Protocol (TFTP) server 304. The IP phone 102 downloads 316 and executes the software to establish the IP socket to the IP phone service provider 202. The IP phone 102 then sends a request 318 for registration to the IP phone service provider 202, which includes its MAC address and set type. The IP phone service provider 202 then sends an Open Port request 320 with the MAC address, the set type, and the IP address (associated information) to the set registration process 204 for registration of the IP phone 102.

The set registration process 204 upon receiving the Open Port request 320 checks the information against its lookup table of data shared with OAM 206 as shown at 322. In the present example of an unregistered IP phone 102, as there is no match 324 for the MAC address, the set registration process 204 sends a message to request a PIN 326, 328 from the user of the IP phone 102. The IP phone 102 in turn displays a message requesting the user to enter a PIN. Upon receipt of the PIN from the user, the IP phone sends the PIN 330 to the IP phone service provider 204, which then sends an Open Port PIN request 332 with the PIN and associated information to the set registration process 204. The set registration process 204 in turn sends a validation request 334 with the PIN and the MAC address to the OAM 206.

The OAM 206, upon receipt of the validation request 334, strips the access code and DN from the PIN. The access code is then validated. The association of the DN with the MAC address is set up in the OAM 206 for directing calls accordingly. Upon completion of the set up, the OAM 206 sends a message, Valid PIN 336, to the set registration process 204 indicating that the set is registered. The lookup table is then updated in both the OAM 206 and the set registration process 204.

To complete the registration, the IP phone 102 is provided with strings, prompts, and information for operation in the phone system. The information includes the user's name. Specifically, the set registration process 204 sends an Open Port Ack 338 (Acknowledgement) to the IP phone service provider 202, which sends a registration acknowledgement 340 to the IP phone 102. Upon receipt of the registration acknowledgement 340, the IP phone 102 sends a Report Set ID (set type) 342 to the OAM 206.

The OAM 206 and the set registration process 204 then downloads strings and prompts 344 desired for operation of the IP phone 102 in the phone system and, at 346, further updates the IP phone display with any information desired to be displayed by the IP phone 102. It is noted that the strings and prompts downloaded to an IP phone include a sequence (not shown) for a user to communicate with the IP phone switch to change a directory number associated with the IP phone to another.

Figure 4:
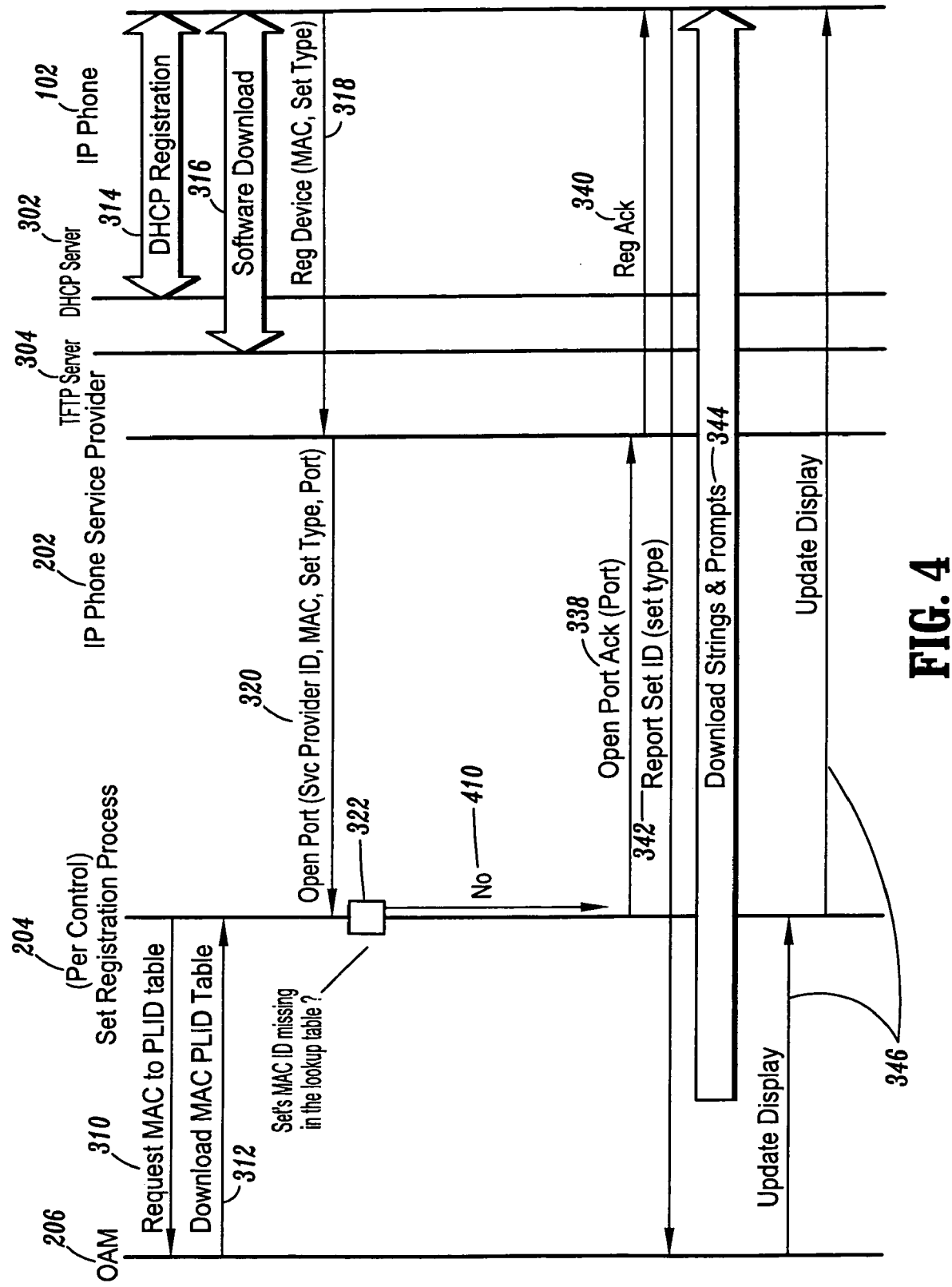
FIG. 4 is a data flow diagram showing registration of a previously registered IP phone according to the phone system of FIG. 1.

FIG. 4 shows a data flow for registration of a previously registered IP phone 102 on the IP phone switch 100. The IP phone switch 100 and the IP phone 102 are initialized and booted-up by processes 310 to 320 as previously described in reference to FIG. 3. Once booted-up, the IP phone service provider 202 sends an Open Port request 320 with the MAC address, the set type, and the IP address (associated information) to the set registration process 204 for registration of the IP phone 102.

Upon receiving the Open Port request 320, the set registration process 204 checks the information against its lookup table of data shared with OAM 206 as shown at 322. In the present example, where the IP phone 102 has been previously registered, there is a match for the MAC address in the lookup table as shown at 410. To complete the registration, the processes 338 to 346, as previously described in reference to FIG. 3, are carried out.

Figure 5:
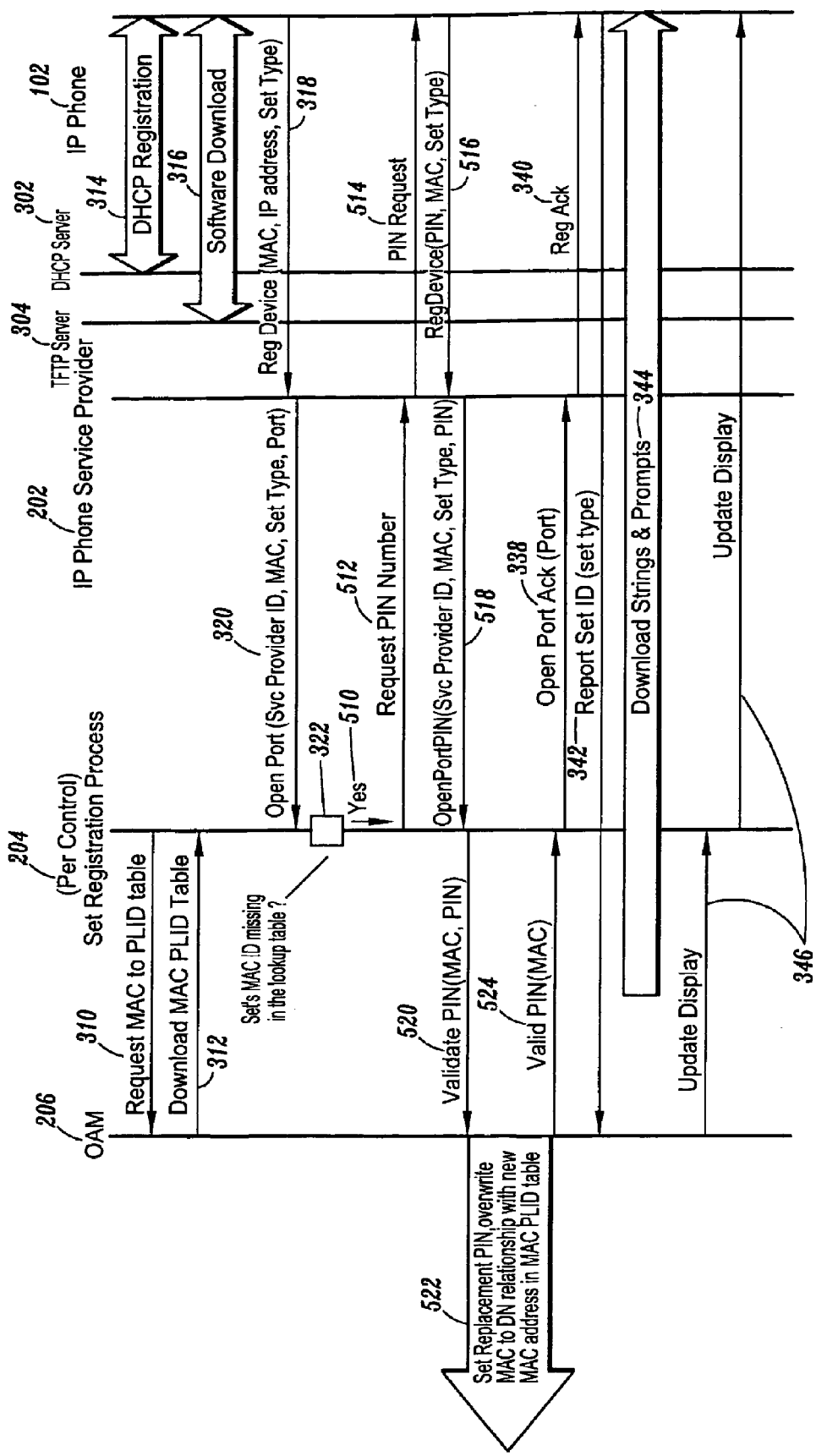
FIG. 5 is a data flow diagram showing registration of a replacement IP phone according to the phone system of FIG. 1.

FIG. 5 shows a data flow for registration of an IP phone 102 on the IP phone switch 100 where the IP phone 102 is a replacement of a previous IP phone. Further, a PIN has been assigned to the user for IP phone replacement. The MAC address of the previous IP phone has also been associated with the PIN in the IP phone switch 100. The IP phone 102 has not been previously registered with the IP phone switch 100. The composition of the PIN includes an access code and a Directory Number (DN).

The IP phone switch 100 and the IP phone 102 are initialized and booted-up by processes 310 to 320 as previously described in reference to FIG. 3. Once booted-up, the IP phone service provider 202 sends an Open Port request 320 with the MAC address, the set type, and the IP address (associated information) to the set registration process 204 for registration of the IP phone 102.

Upon receiving the Open Port Request 322, the set registration process 204 checks the information against its lookup table of data shared with OAM 206 as shown at 322. In this case of a replacement IP phone, as there is no match for the MAC address as shown at 510, the set registration process 204 sends a message 512, 514 to the IP phone 102 requesting a PIN from the user. The IP phone 102 displays the message requesting the user to enter a PIN. When the PIN is received from the user, the IP phone 100 sends the information to the IP phone service provider 204 as shown at 516, which sends an Open Port PIN request 518 with the PIN and associated information to the set registration process 204. The set registration process 204 in turn sends a validation request 520 with the PIN and the MAC address to the OAM 206.

The OAM 206, upon receipt of the validation request 520, strips the registration access code and DN from the PIN. The access code is validated. The MAC address of the previous IP phone is replaced with the MAC address of the replacement IP phone 102 in the OAM 206 for directing calls accordingly as shown at 522. The OAM 206 then sends a message, Valid PIN 524, to the set registration process 204 indicating that the new set is registered. The lookup table is updated in both the OAM 206 and the set registration process 204. To complete the registration, the processes 338 to 346, as previously described in reference to FIG. 3, are carried out.

Figure 6:
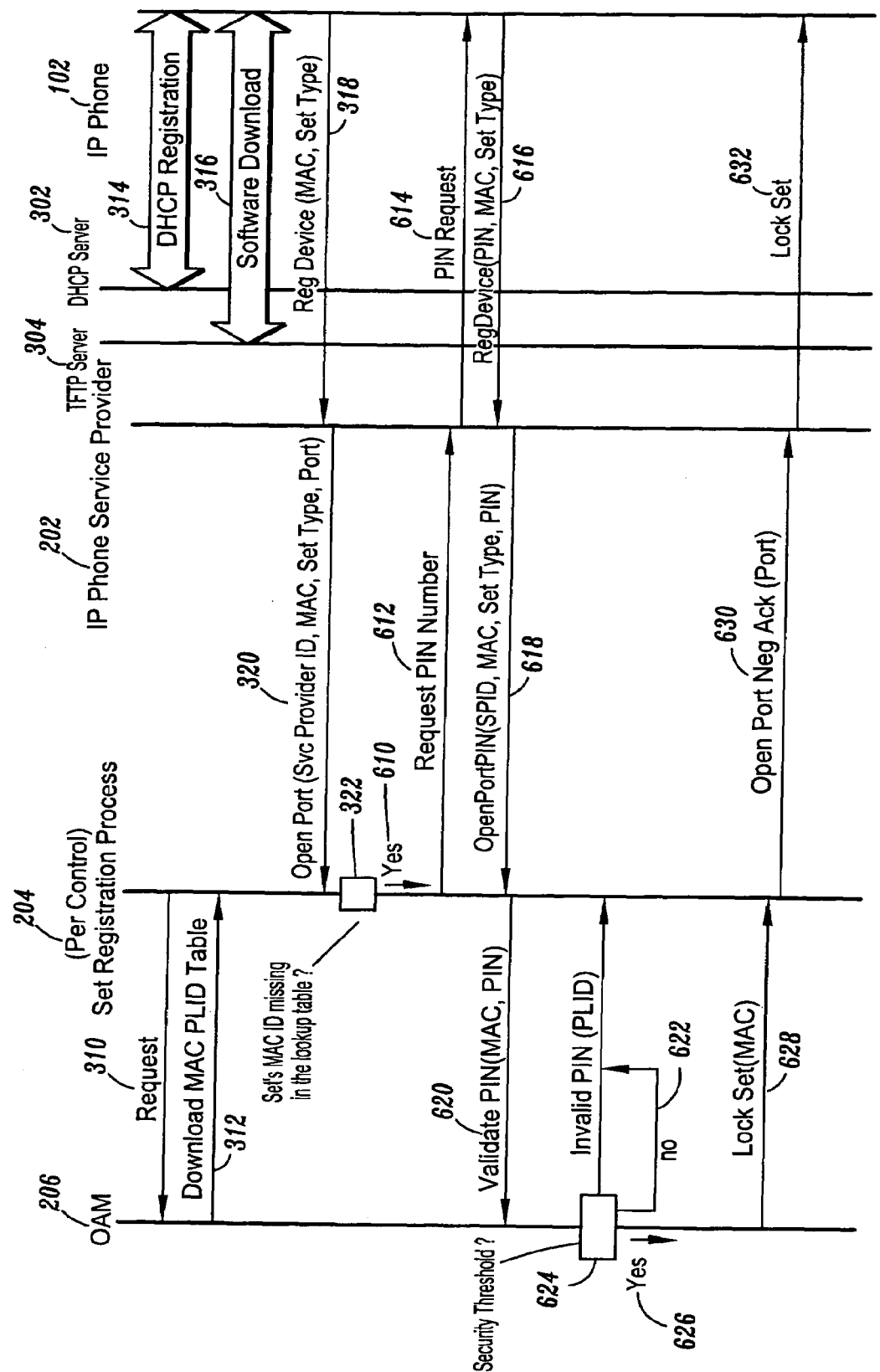
FIG. 6 is a data flow diagram showing registration of an IP phone where an incorrect personal identification number has being provided according to the phone system of FIG. 1.

FIG. 6 shows a data flow for registration of an unregistered IP phone 102 on the IP phone switch 100 where the IP phone 102 has not been previously registered with the IP phone switch 100 and where a user enters an incorrect, or fraudulent, PIN into the IP phone 102 for registration. The IP phone switch 100 and the IP phone 102 are initialized and booted-up by processes 310 to 320 as previously described in reference to FIG. 3. Once booted-up, the IP phone service provider 202 sends an Open Port request 320 with the MAC address, the set type, and the IP address (associated information) to the set registration process 204 for registration of the IP phone 102.

Upon receiving the Open Port Request 320, the set registration process 204 checks the information against its lookup table of data shared with OAM 206 as shown at 322. In the present example of an unregistered phone, there is no match for the MAC address as shown at 610, so the set registration process 204 sends a message to the IP phone 102 requesting a PIN 612, 614 from the user. The IP phone 102 displays the message requesting the user to enter a PIN. Upon receipt of the PIN from the user, the IP phone 102 sends the PIN to the IP phone service provider 204 as shown at 616, which in turn sends an Open Port PIN request 618 with the PIN and associated information to the set registration process 204. The set registration process 204 sends a validation request 620 with the PIN and the MAC address to the OAM 206.

The OAM 206, upon receipt of the validation request 620, strips the registration access code and DN from the PIN. As the PIN is incorrect, as shown at 622 the access code is not validated and the IP phone 102 registration attempt fails. In addition, the OAM 206 tracks the number of consecutive failed registration attempts at 624. In the event that the number of consecutive failed registration attempts exceed a security threshold 626, the OAM 206 sends a lock set request 628 to the set registration process 204, which blocks accesses to the IP phone switch 100 from the MAC address of the IP phone 102. Further, the set registration process 204 sends an Open Port Neg Ack instruction 630 containing the lock set command to the IP phone service provider 202 for execution 632.

Figure 7:
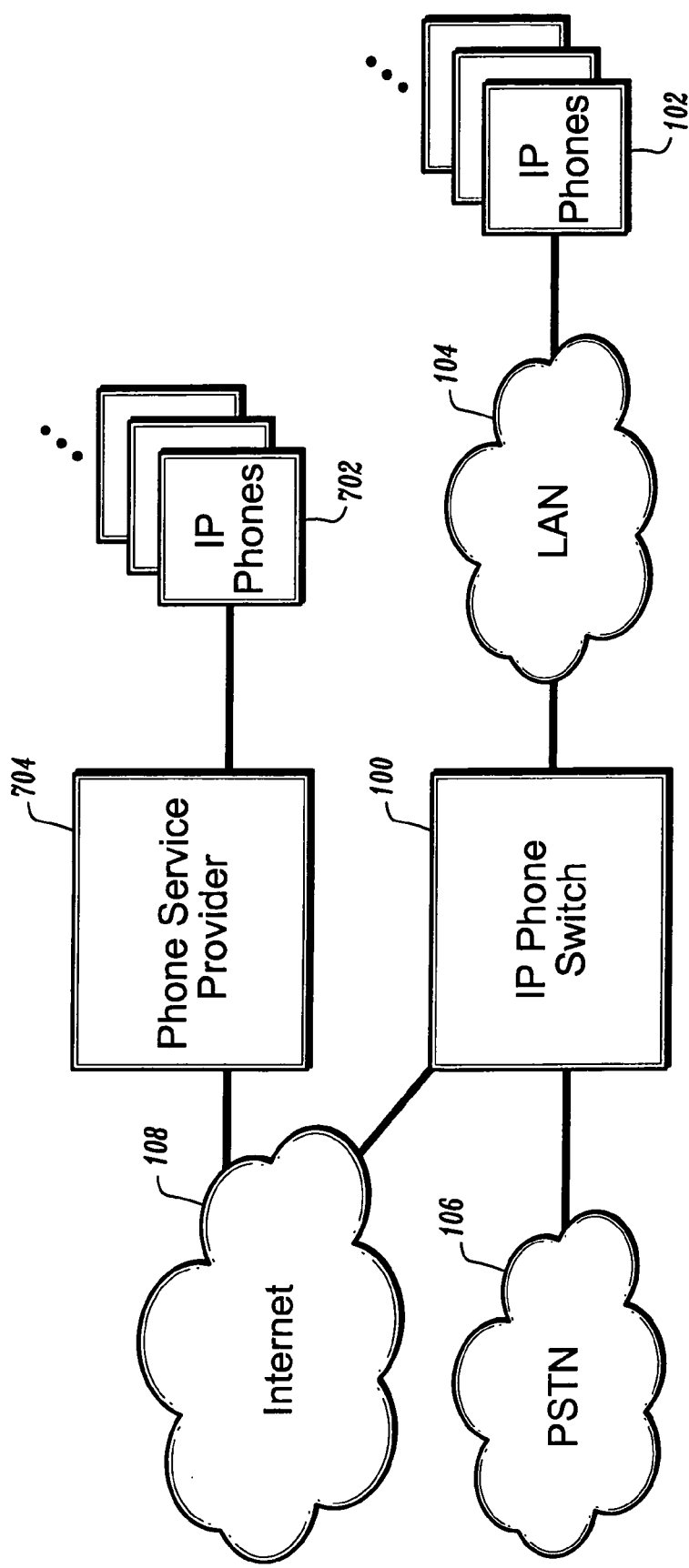
FIG. 7 illustrates an overview of an alternate phone system including an IP phone switch connected to remote IP phones over the Internet.

Turning to FIG. 7, an alternative embodiment is shown of a phone system including IP phones 102 and an IP phone switch 100 interconnected by a LAN 104 as shown. In addition, the phone system includes remote IP phones 702 that communicate to the IP phone switch 100 via the Internet 108. A phone service provider 704 connects the IP phones 702 to the Internet 108. The phone service provider 704 has the same function as, and replaces, the IP phone service provider 202 for the IP phones 702. In this alternate embodiment, a PIN identifies a user as being authorized and identifies the user of an IP phone 702, where the IP phone 702 has a MAC address and an IP address. The MAC address and IP address are then associated with the DN contained within the PIN in the IP phone switch 100. Users are able to remotely access the services of the IP phone switch 100 over the Internet 108. Further, since their directory numbers are contained within their PINs, each user is able to receive telephone calls at his/her directory number wherever they may be by connecting an IP phone to the Internet 108.

Figure 8A:
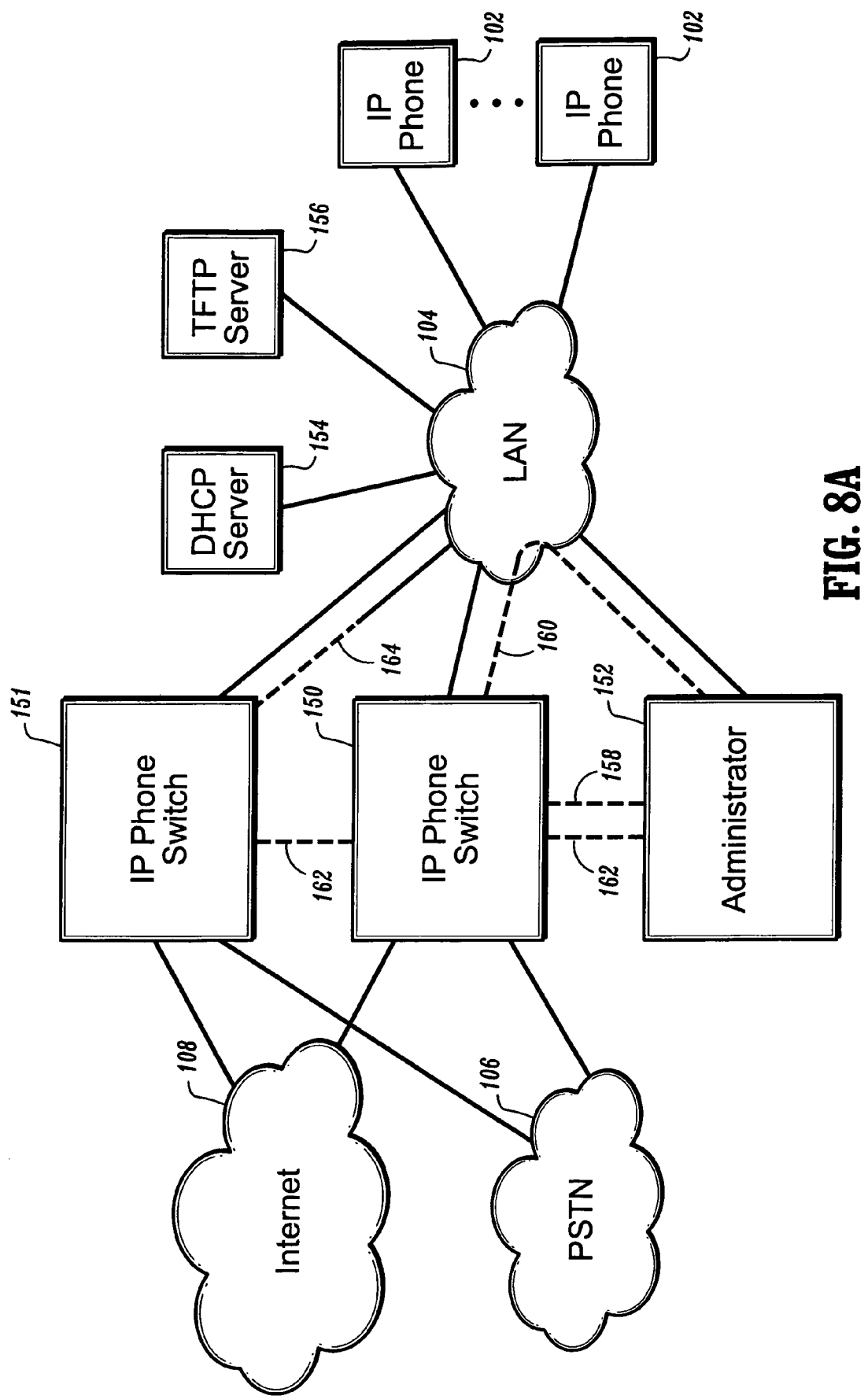
FIG. 8A illustrates an overview of another alternate phone system including an IP phone switch, an Administrator, and a plurality of IP phones.
Figure 8B:
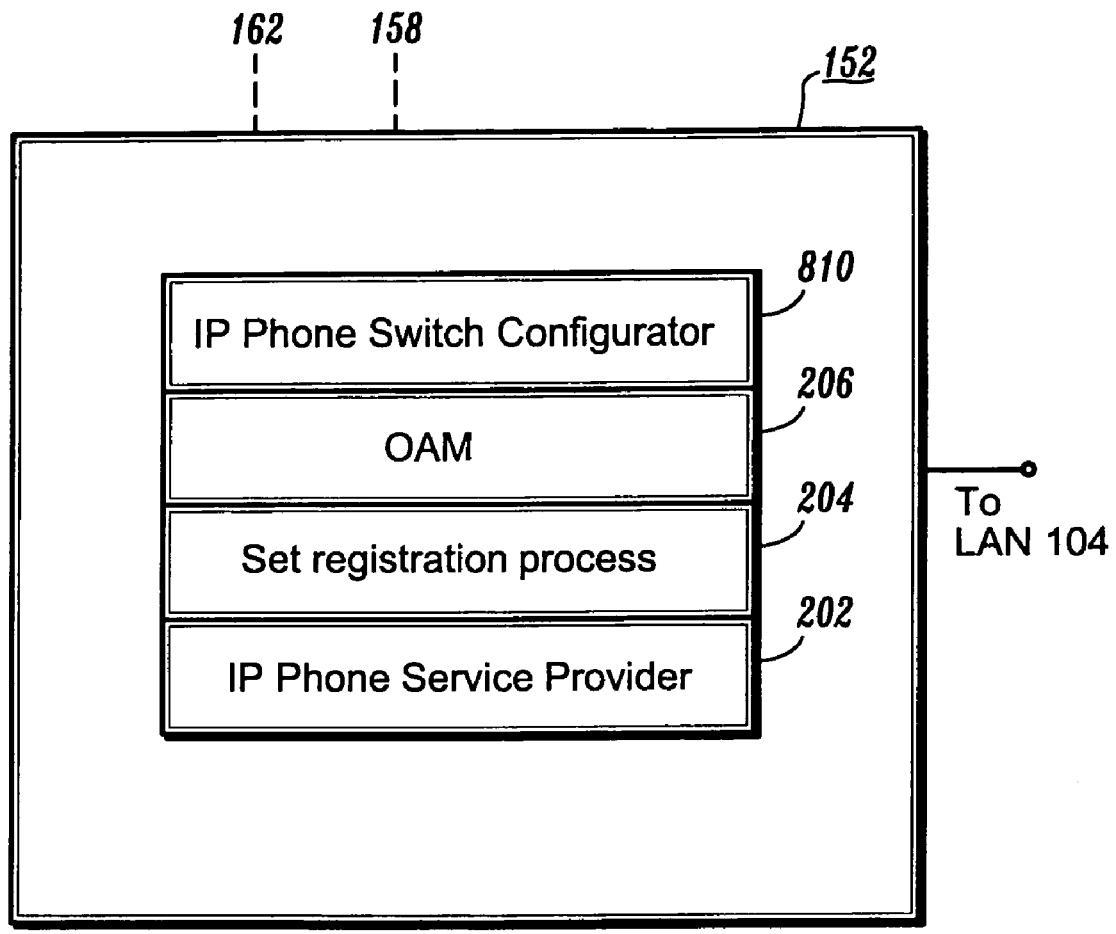
FIG. 8B illustrates some of the functional blocks of the Administrator shown in FIG. 8A.

Turning to FIGS. 8A and 8B, another alternate embodiment of a phone system is shown including IP phones 102, an Administrator 152, an DHCP Server 154, an TFTP Server 156, and IP phone switches 150 interconnected by a LAN 104. As shown in FIG. 8B, the Administrator 152 includes the three primary functional blocks, namely—IP phone service provider 202, set registration process 204 and OAM 206—of the IP phone switch 100 of FIG. 2. The Administrator 152 further includes an IP phone switch configurator 810 to configure IP phone switches to associate directory numbers with the IP phones 102. The Administrator 152 configures IP phone switch 150 over a direct line 158, or optionally over network line 160. The Administrator 152 may further configure more than one IP phone switch, such as, for example, IP phone switch 151 over lines 162 and 164.

The process to establish an IP socket is well known. The DHCP and TFTP servers do not have to be part of an IP phone switch, these servers can be independent of the IP phone switch, such as, for example, as shown in FIG. 8A.

A number of further alternatives are described below. A user may specify a DN, at will, to associate with a PIN, which as previously noted has a separate access code. Provided the specified DN is not being used, the DN can be associated with the user. A user may be assigned several PINs for the same directory number where each PIN has a different purpose, for example, a PIN for an unsecured IP phone, which expires after one use, and another PIN for a different directory number. A user may have a number of different directory numbers associated with one IP phone. A PIN may also associate a DN to an IP phone temporarily, such as 24 hours, for a user to receive calls for the DN wherever he or she may be temporarily located.

It will also be understood by those skilled in the art that farther alternate embodiments for connecting telephones to IP phone switches are available, such as, by direct line to the IP phone switches instead of via a network.

It will also be understood by those skilled in the art that, while MAC addresses of IP phones disclosed herein are unique, such uniqueness is not essential provided that there is a unique address code for each IP phone where the address codes are unique within the network to which they are connected.

Although preferred embodiments of the invention have been described herein, it will be understood by those skilled in the art that variations may be made thereto without departing from the scope of the invention or the scope of the appended claims.

What is claimed is:

1. A method for an IP phone switch to register an IP phone over a network, the IP phone having a a Media Access Control (MAC) address, an IP address and a set type, said method comprising:
    (a) associating a unique personal identification number (PIN) with a directory number (DN) at the IP phone switch;
    (b) establishing communications between the IP phone and the IP phone switch;
    (c) receiving the MAC address and the set type from the IP phone;
    (d) sending a message to the IP phone causing the IP phone to display a prompt for entry of the PIN and upon receipt of the PIN, forwarding the PIN to the IP phone switch;
    (e) authenticating the PIN; and
    (f) associating the DN with the MAC address for routing and switching call traffic to and from the IP phone.

2. The method of claim 1, wherein the directory number is a part of the personal identification number.

3. The method of claim 1, wherein step (d) is repeated in the event that the personal identification number fails authentication in step (e).

4. The method of claim 3, further comprising a step to determine if step (d) has been repeated in excess of a predetermined number of consecutive times due to the personal identification number failing authentication and in response sending a lock set commend to the IP phone.

* * * * *